(12) United States Patent (10) Patent No.: US 8,086,968 B2
McCaffrey et al. (45) Date of Patent: Dec. 27, 2011

(54) DYNAMIC E-MAIL SIGNATURE MANAGER

(75) Inventors: Corey S. McCaffrey, Boston, MA (US); Fang Lu, Billerica, MA (US); Elaine I. Kuo, North Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 12/060,911

(22) Filed: Apr. 2, 2008

(65) Prior Publication Data

US 2009/0254858 A1 Oct. 8, 2009

(51) Int. Cl.
*G06F 3/00* (2006.01)
(52) U.S. Cl. .......................... 715/810; 715/860; 715/866
(58) Field of Classification Search .................. 715/860, 715/810, 866
See application file for complete search history.

(56) References Cited

U.S. PATENT DOCUMENTS

| | | | | |
|---|---|---|---|---|
| 6,510,453 | B1 * | 1/2003 | Apfel et al. | 709/206 |
| 6,779,178 | B1 * | 8/2004 | Lloyd et al. | 717/174 |
| 7,865,562 | B2 * | 1/2011 | Nesbitt et al. | 709/206 |
| 7,882,186 | B1 * | 2/2011 | Sun | 709/206 |
| 2003/0217107 | A1 * | 11/2003 | Parry | 709/206 |
| 2004/0019644 | A1 * | 1/2004 | Fellenstein et al. | 709/206 |
| 2005/0251760 | A1 * | 11/2005 | Sato et al. | 715/856 |
| 2009/0030933 | A1 * | 1/2009 | Brezina et al. | 707/102 |

OTHER PUBLICATIONS

Which? report : Create an email signature, Nov. 1, 2005, pp. 1-2.

* cited by examiner

*Primary Examiner* — Ryan Pitaro
(74) *Attorney, Agent, or Firm* — David A. Dagg

(57) ABSTRACT

A dynamic electronic mail signature manager for managing a user's electronic mail signatures inserted into electronic mail messages. An electronic mail signature is displayed within a message composition user interface such that each component of the electronic mail signature is displayed in either an "include" display state or a visually distinct "omit" display state. Electronic mail signature components that are in the "omit" display state at the time the user indicates that the electronic mail message is to be sent are not included in the transmitted message. The user can toggle signature components between the "include" and "omit" display states by selecting individual objects. The initial state of each component when the user begins to compose a message (e.g. a new message, a reply message, etc.) may be automatically determined based on user configuration information, and/or based on message history information with respect to an indicated destination.

17 Claims, 5 Drawing Sheets

New Message

To: Bill Shopkeep ← 42
From: Jane Sendman
Re: Your First Order

Dear Mr. Shopkeep,

Thank you for you order. We look forward to working with you more in the future.

Thank you,

44

Dynamic Signature Area

53 → Jane Sendman
Sales Manager
Company Name, Inc.
123 Tool Way
Suite #440
50 → Santa Fe, NM 12345
Tel: 555-460-1234
(omit) Fax: 555-460-5678
*Cell: 555-460-9898*
51 → Email: jane.sendman@companyname.com } Signature 48

Signature Preferences

Enter your signature below and choose which lines should be ommited by default

Signature:

Jane Sendman
Sales Manager
Company Name, Inc.
123 Tool Way
Suite #440
Santa Fe, NM 12345
Tel: 555-460-1234
Fax: 555-460-5678
Cell: 555-460-9898
Email: jane.sendman@companyname.com

62

Omit?
☐ ☐ ☐ ☐ ☐ ☐ ☐ ■ ☐

64

☐ Always append this signature (disable Dynamic E-mail Signature Manager)

65

Advanced...

66

Cancel    OK

DYNAMIC E-MAIL SIGNATURE MANAGER

FIELD OF THE INVENTION

The invention relates generally to computer communication systems, and more specifically to a dynamic electronic mail (e-mail) signature manager.

BACKGROUND OF THE INVENTION

As a courtesy to e-mail recipients, e-mail senders often append a few lines of text to their messages, including "signature" information such as their name, company, phone numbers, and other pertinent contact information. As a convenience to e-mail senders, nearly all modern e-mail applications provide a feature that enables automatic inclusion of a pre-defined signature with a transmitted message. However, a shortcoming of existing systems is that after the signature is automatically inserted into the message, the user must manually modify the signature contents if they desire to send anything other than the complete pre-defined signature. Such manual modifications are inconvenient, and users are accordingly discouraged from making changes to their e-mail signature, even though e-mail signatures are rarely "one size fits all."

For example, it may be desirable to have one version of an e-mail signature for external clients (e.g. not including company internal contact information), another version for co-workers (e.g. including the company internal contact information), and, perhaps, no signature at all for close friends and/or frequent contacts. Moreover, a sender may wish to customize their e-mail signature based on the context in which a specific message is being sent. For example, a user may wish to avoid sending their office phone number in a message sent while they are working remotely from the office, and wish instead to only include their cell phone number. Similarly, a sending user may prefer not to send their cell phone number in a message sent while they are in the office. People with multiple office locations may wish to modify their e-mail signature information based on which office they are sending a message from, e.g. so that the phone and/or fax number in the signature matches their current phone and fax machine. Thus it is apparent that the requirement of manually modifying e-mail signature information on a message by message basis can become a significant burden.

These problems with existing e-mail signature systems are exacerbated by the commonplace practice of replying with message history, which typically includes the signatures of everyone already participating in an e-mail thread, and perhaps multiplied for each additional reply from the same person. If a sender is courteous enough to manually delete the unnecessary signature copies, it becomes an annoyance and time sink to the sender. On the other hand, if the sender does not take the time to manually delete unnecessary signatures, recipients may be distracted and lose time sifting through excessive lines of text.

For the above reasons and others it would be desirable to have a more effective e-mail signature management system that does not require a sending user to manually edit e-mail signatures as needed for each individual message sent.

SUMMARY OF THE INVENTION

To address the above described and other shortcomings of previous approaches, a dynamic electronic mail signature manager is disclosed. The disclosed system displays an electronic mail signature within a message composition user interface used to compose a new message. The electronic mail signature is made up of a number of discrete components. Each component may be a single line or a group of lines of text (e.g. made up of or including the user's name, the user's address, a telephone, fax or cell phone number, the user's electronic mail address, screen name, etc.) a graphical object (e.g. a graphical representation of a user, a graphical representation of the user's real world signature, etc.), and/or some other visual component.

Each component of the electronic mail signature is displayed in one of two display states. The first of the two display states is the "include" display state. Components that are in the "include" display state at the time the user indicates that the message is to be sent are included in the transmitted message (e.g. appended to or inserted into a message body also defined using the message composition user interface). The second of the two display states is the "omit" display state. Components that are in the "omit" display state at the time the user indicates that the message is to be sent are not included in the transmitted message.

Electronic mail signature components in the "omit" display state are visually distinct from electronic signature components in the "include" display state. For example, lines of text in the "omit" state may be italicized and/or grayed out, while components in the "include" state may be displayed in their normal (e.g. non-italicized, non-grayed out) format. In addition, a textual or other indication (the text "omit" or the like) may be displayed in visual proximity to components that are currently in the "omit" state.

The disclosed system enables a user to conveniently toggle electronic signature components between the "include" and "omit" display states. For example, in one embodiment, components toggle between the "include" and "omit" display states in response to the user selecting individual components using a user interface device (e.g. by clicking on individual components using the mouse).

The initial state of each electronic signature component when the user begins to compose a message (e.g. a new message, a reply message, etc.) may be automatically determined based on user configuration information. For example, in one embodiment, the disclosed system enables the user to set the default initial display state of individual components through a user preferences user interface display object.

In another embodiment, the disclosed system enables the user to define electronic mail signature initial state rules. Such user defined rules indicate the initial states of individual signature components for user-specified individual destination addresses, and/or for user-specified destination domains. Accordingly, in such an embodiment, the disclosed system dynamically checks the destination field in the message composition user interface for any individual destination addresses and/or destination domains for which are defined any signature initial state rules. In response to detecting an individual destination address or destination domain for which there exists a signature initial state rule, the disclosed system sets the initial states of specific signature components as defined by the applicable rule.

In another embodiment, the disclosed system uses message history to determine the initial state of the entire electronic mail signature, and/or of specific signature components. In such an embodiment, the disclosed system maintains a frequency threshold value, and a recency threshold value. When the user initiates composition of a new message, the disclosed system determines the number of messages that the user has sent to the message destination within a predetermined period of time (e.g. a day). The disclosed system also determines the amount of time since the last message was sent to the destination. If the number of messages sent to the destination within the predetermined time period is at least as large as the frequency threshold value, and the amount of time since the last message was sent to the destination is not larger than the recency threshold value, then the disclosed system sets the electronic mail signature components to a pre-determined initial state, e.g. all components in the "omit" state.

Thus there is disclosed a more effective e-mail signature management system that does not require a sending user to manually edit e-mail signatures as needed for each individual message sent

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 2 is a simplified screen shot showing a portion of a message composition user interface generated by an illustrative embodiment of the disclosed system;

FIG. 3 is a simplified screen shot showing a portion of a user preferences user interface generated by an illustrative embodiment of the disclosed system;

DETAILED DESCRIPTION OF EXEMPLARY EMBODIMENTS

Figure 1:
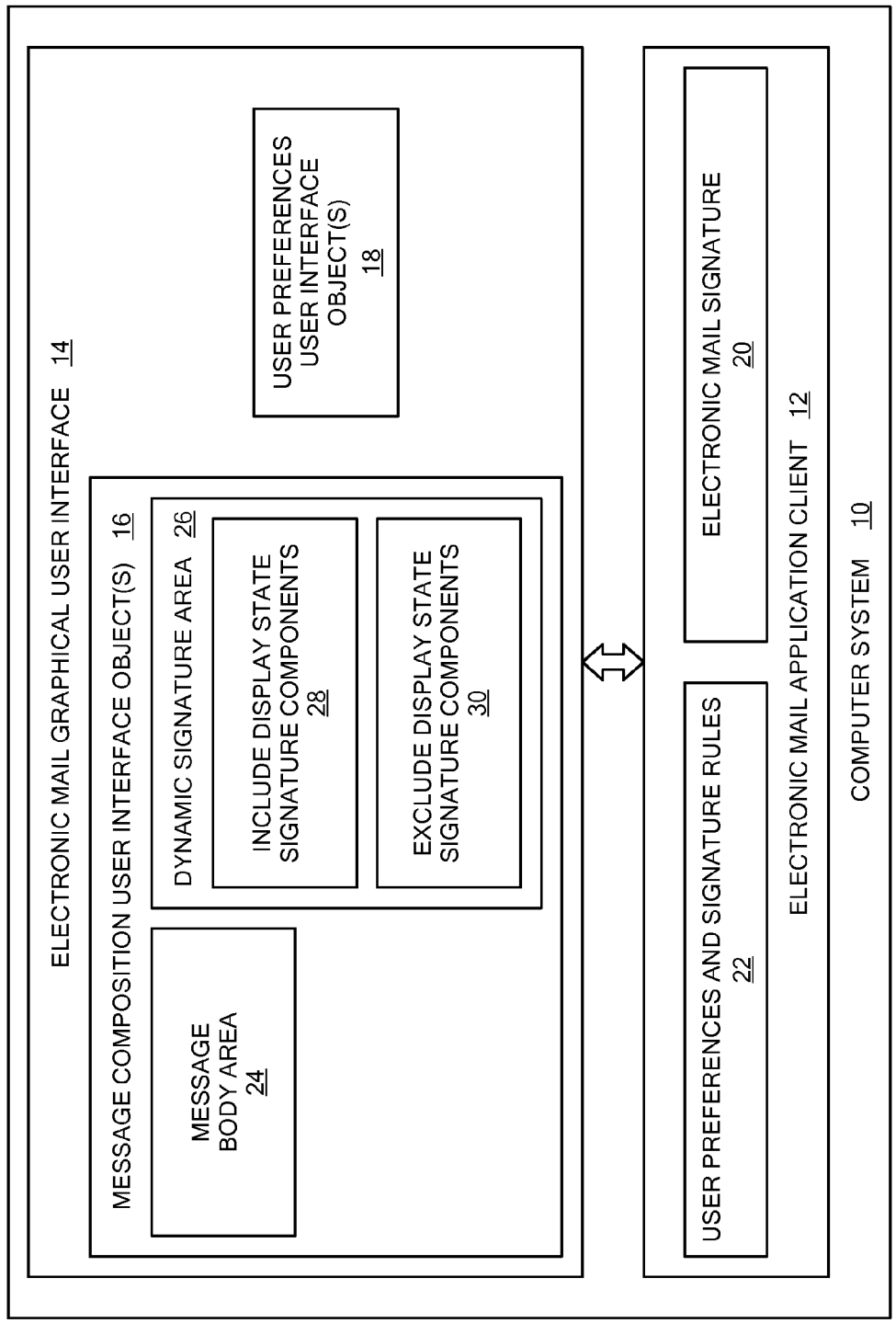
FIG. 1 is a block diagram showing components in an illustrative embodiment of the disclosed system.

FIG. 1 is a block diagram showing components in an illustrative embodiment of the disclosed system. As shown in FIG. 1, a Computer System 10 includes an Electronic Mail Application Client 12 that generates an Electronic Mail Graphical User Interface 14. The Electronic Mail Graphical User Interface 14 includes Message Composition User Interface Object(s) 16 and User Preferences User Interface Object(s) 18. The Message Composition User Interface Object(s) 16 enable a user of the Computer System 10 to compose a new electronic mail ("e-mail") message, and the User Preferences User Interface Object(s) 18 enable the user of the Computer System 10 to set various configuration settings that apply to operation of the Electronic Mail Application Client 12 and/or any associated server software. The Message Composition User Interface Object(s) 16 include a Message Body Area 24, in which the user can type or otherwise enter message contents to be included in the new message. The Dynamic Signature Area 26 displays the Electronic Mail Signature 20. Individual components of the Electronic Mail Signature 20 displayed in the Dynamic Signature Area 26 are displayed in either an "include" display state, as shown in FIG. 1 by Include Display State Signature Components 28, or in an "omit" display state, as shown in FIG. 1 by Exclude Display State Signature Components 30. Electronic mail signature components displayed in the "include" display state are transmitted with the new message when the user clicks on a "Send" button or otherwise indicates that the new message is to be sent, while electronic mail signature components displayed in the "omit" display state are omitted from the new message when it is transmitted.

The Electronic Mail Signature 20 includes information associated with the user of the Computer System 10, and may be defined by the user through the User Preferences User Interface Objects 18 or some other user interface object provided by the Electronic Mail Application Client 12. The Electronic Mail Signature 20 is made up of a number of discrete components. Each component in the Electronic Mail Signature 20 may be a single line of text, or a group of lines of text (e.g. made up of or including the user's name, the user's address, a telephone, fax or cell phone number, the user's electronic mail address, screen name, etc.) a graphical object (e.g. a graphical representation of a user, a graphical representation of the user's real world signature, etc.), and/or some other visual component. Since the disclosed system enables the user to conveniently toggle signature components between the "include" and "omit" display states on a message by message basis, the user may include alternative components in the Electronic Mail Signature 20. For example, the user may define alternative phone numbers of different offices within the Electronic Mail Signature 20, and then set one of the alternative phone numbers to the "omit" state when sending each message, such that only the phone number of the office from which the user is sending the message is included in the message. Other types of alternative or optional signature information may similarly be included in the Electronic Mail Signature 20, such that the Electronic Mail Signature 20 effectively operates as a "meta" signature, from which the user can easily select the appropriate signature components to be used in each individual message sent.

Additionally, the disclosed system may be embodied such that individual components of the Electronic Mail Signature 20 are automatically set to one of the "include" or "omit" states within the Dynamic Signature Area 16 based on user-provided configuration values or settings, for example as provided by the user through the User Preferences User Interface Objects 18 and stored in the User Preferences and Signature Rules 22. Moreover, embodiments of the disclosed system may automatically set individual components of the Electronic Mail Signature 20 to one of the "include" or "omit" states within the Dynamic Signature Area 16 based on how frequently and/or how recently the user has communicated with recipients indicated for individual messages as they are composed using in the Message Composition User Interface Object 16.

The Computer System 10 of FIG. 1 may be any specific type of computer system and/or intelligent electronic device, such as a desktop, laptop, or palmtop computer system, and/or personal digital assistant, cell phone, or other electronic device. The Computer System 10 includes or controls a display device capable of displaying a graphical user interface (e.g. including Electronic Mail Graphical User Interface 14) to a respective local user, such as a liquid crystal display (LCD), cathode ray tube (CRT), interferometric modulator display (IMOD), light emitting diode (LED), or the like.

Those skilled in the art will further recognize that the Electronic Mail Application Client 12 of FIG. 1 may be embodied using software or firmware, such as computer application program code, operating system program code, or middleware, and/or wholly or partly using digital hardware components, such as application specific integrated circuits (ASICs), field-programmable gate arrays (FPGAs), and the like, and/or combinations of hardware and/or software or firmware.

Those skilled in the art will further recognize that the Computer System 10 of FIG. 1 may include one or more processors, and program storage, such as memory, for storing program code executable on such processors, as well as input/output devices and/or interfaces. In the example of FIG. 1, the Computer System 10 is connected to a data communication network (e.g. the Internet, a Local Area Network, etc.) through one or more of such input/output devices or interfaces, and through which may further be provided communication to a number of other client systems and/or remote server systems.

While for purposes of concise illustration only one computer system is shown in FIG. 1, the disclosed system is not limited to any specific number of computer systems. Moreover, while certain functions are described as being performed by the Electronic Mail Application Client 12, the disclosed system is not limited to any specific configuration or implementation in that regard. Accordingly, operations described as occurring in the Electronic Mail Application Client 12 may alternatively be performed in one or more interconnected server systems. In addition, while the illustrative embodiment of FIG. 1 is described using a client-server architecture, the disclosed system is not limited to such an embodiment, and may alternatively be embodied using any other specific type of system architecture that may be appropriate and/or advantageous for a given implementation.

FIG. 2 is a simplified screen shot showing a portion of a Message Composition User Interface 40 generated by an illustrative embodiment of the disclosed system. As shown in FIG. 2, the Message Composition User Interface 40 includes a Destination Address field 42, including for purposes of illustration the recipient identifier "Bill Shopkeep". When the user (e.g. "Jane Sendman") indicates that the electronic mail message being composed using the Message Composition User Interface 40 is to be sent (e.g. by clicking on a conventional "Send" graphical button or the like), the message will be sent to the recipient "Bill Shopkeep". The Destination Address field 40 may include recipient identifiers of any specific type, as entered by the user composing the message, such as individual e-mail addresses, group addresses, etc.

A Message Body Area 44 allows the user to enter in text or other contents to be included in the e-mail message when it is sent. A Dynamic Signature Area 46 is automatically loaded with the user's Electronic Mail Signature 48. In the example of FIG. 2, each line of the Electronic Mail Signature 48 is an independent signature component. Each component of the Electronic Mail Signature 48 is displayed in either the "include" display state, or in the "omit" display state. For example, signature components in the "include" display state are displayed in regular text format, whereas signature components in the "omit" display state are displayed in italicized text format. In addition, each signature component in the "omit" state has displayed next to it the text "(omit)". Thus the Electronic Mail Signature 48 includes a single component 50 that is currently in the "omit" state, while all other components are in the "include" state. As a result, if the user were to indicate that the message is to be sent without changing the display state of any of the signature components from what is shown in FIG. 2, the component 50, consisting of the user's cell phone information, would be omitted from the message sent to "Bill Shopkeep", while all other components of the Electronic Mail Signature 48 (i.e. all other lines) would be included in the message.

Further in the example of FIG. 2, the user can toggle individual components of the Electronic Mail Signature 48 between the "include" and "omit" display states by clicking on them. For example, if the user were to click on the component 50, which is shown in the "omit" display state, the component 50 would change to the "include" display state, causing the component to be displayed in normal text format (i.e. non-italicized). If the user were to then indicate that the message being composed was to be sent, the component 50 would be included in the transmitted message. Similarly, if the user were to click on the component 51, which consists of the user's e-mail address information, the component 51 would change from the "include" display state to the "omit" display state, and would not be included in the transmitted message if the user then indicated that the message was to be sent.

The display states of the components in the Electronic Mail Signature 48 may further be automatically set by the disclosed system in response to previous message history. Specifically, the disclosed system may monitor or check the contents of the Destination Address field 42, and compare the number of messages sent to a recipient indicated in the Destination Address field 42 within a predetermined preceding time period to a frequency threshold. The disclosed system may also compare the time since the last message was sent to a recipient indicated in the Destination Address field 42 to a recency threshold. For example, if the user "Jane Sendman" had sent 10 messages to a user "Joe Receiveman" within the last twenty-four hours, with the last such message sent within the last five minutes, and the frequency threshold is equal to five messages in twenty-four hours, and the recency threshold is one hour, then the disclosed system would operate to set the components of Electronic Mail Signature 48 to display states defined by the user for use with messages when the frequency threshold and recency threshold are met or exceeded with regard to a message recipient. For example, in such a case, the display state of each component in the Electronic Mail Signature 48 would be automatically set to the "omit" display state, with the exception of the component 53 consisting of the user's name. The frequency and recency thresholds used in this regard may be user-configurable.

The display states of the components in the Electronic Mail Signature 48 may further be automatically set by the disclosed system in response to display state rules defined by the user. For example, the user may define rules that determine how the display states of the components in the Electronic Mail Signature 48 are automatically set based on the contents of the Destination Address field 42. For example, the user may define an individual recipient identifier or address (e.g. e-mail address) such that when a message is being composed and the Destination Address field 42 contains that identifier or address, the components of the Electronic Mail Signature 48 are automatically set to a predetermined set of corresponding display states. Accordingly, the user can indicate a specific rule for all messages sent to the recipient address of a spouse or close friend, so that all signature components are initially set to the "omit" display state for such messages, since there is no need to send contact information to such recipients that would already have it.

FIG. 3 is a simplified screen shot showing a portion of a User Preferences User Interface Object 60 generated by an illustrative embodiment of the disclosed system. As shown in FIG. 3, checkboxes 64 enable a user to set the initial state of each component (e.g. text line) of the electronic mail signature shown in the Signature Display Area 62. In the example of FIG. 3, when one of the checkboxes 64 is set (e.g. clicked on by the user), then the corresponding line of the electronic mail signature shown in the Signature Display Area 62 will be in the "omit" display state when it is initially displayed in the message composition user interface.

Further in the example of FIG. 3, override checkbox 65 enables the user to disable the disclosed system, such that the electronic mail signature displayed in the Signature Display Area 62 is always appended to transmitted e-mail messages. The user can access the User Preferences User Interface Object 80 of FIG. 4 by clicking on the "Advanced" button 66.

Figure 4:
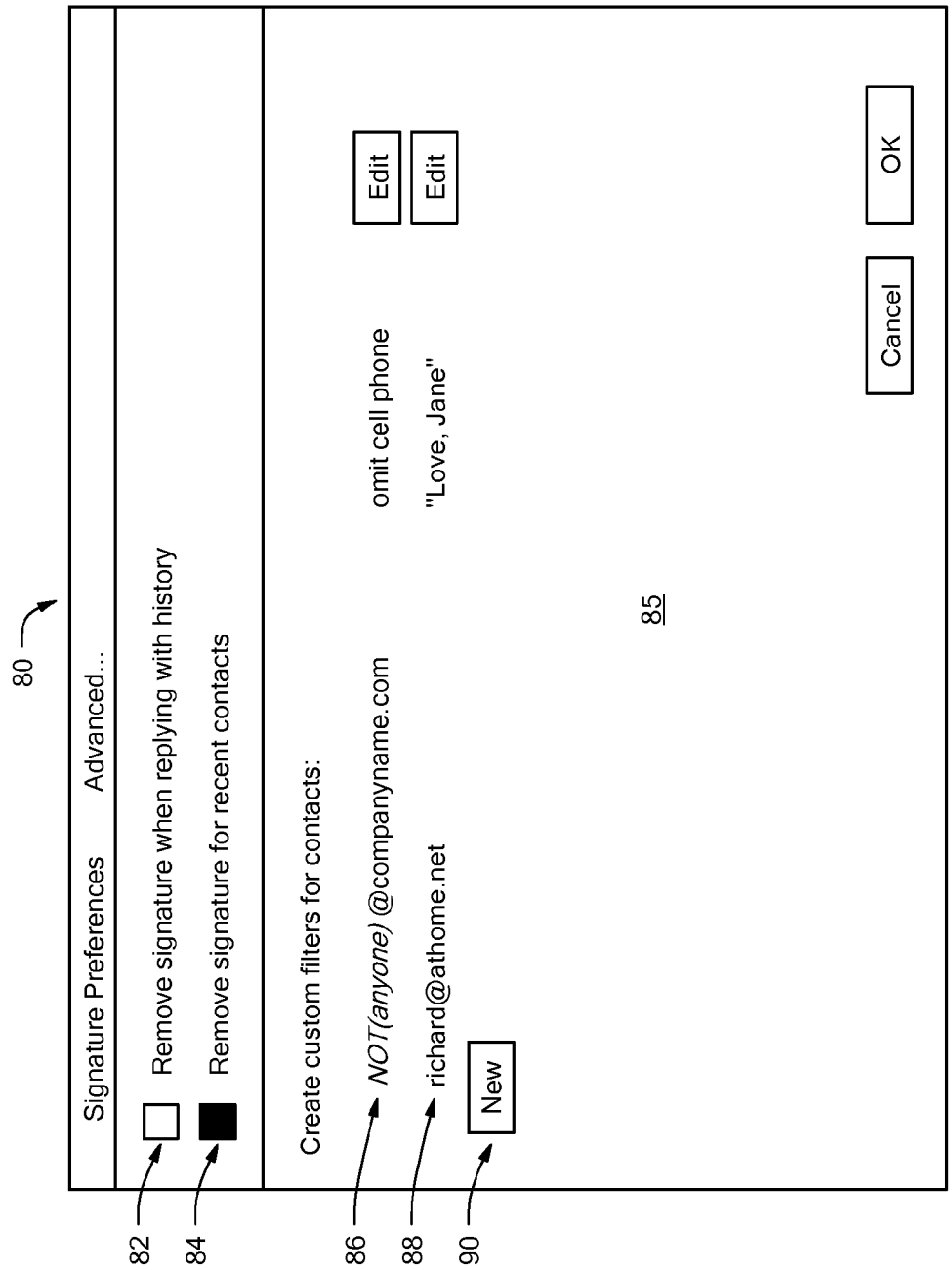
FIG. 4 is a simplified screen shot showing another portion of a user preferences user interface generated by an illustrative embodiment of the disclosed system.

FIG. 4 is a simplified screen shot showing another portion of a User Preferences User Interface Object 80 generated by an illustrative embodiment of the disclosed system. As shown in FIG. 4, a checkbox 82 enables the user to cause the disclosed system to remove their electronic mail signature from messages being sent with history. A checkbox 84 enables the user to cause the disclosed system to remove their electronic mail signature from messages being sent to recent contacts. The disclosed system may, for example, be embodied such that user indication that the user's electronic mail signature is to be automatically "removed"(e.g. by setting of the checkbox 82 or checkbox 84) causes the electronic mail signature to be initially displayed with all components in the "omit" display state for the appropriate type of message (i.e. either messages that are replies with history, or messages that are being sent to recent contacts, respectively).

A rule creation area 85 allows the user to create a number of electronic signature rules. For example, as shown in FIG. 4, the user has defined a rule 86 that causes the cell phone component of the user's electronic mail signature to be automatically set to the "omit" display state in response to detecting that the recipient indicated in the destination address field of the new message composition user interface object is not an e-mail address including the domain name of "companyname.com." As a result, for messages sent to recipients in the sender's company, the sender's cell phone information will be set to the "include" display state. Further shown in FIG. 4, the user has defined a rule 88 that causes a signature consisting of "Love, Jane" to be automatically inserted in response to detecting that the recipient indicated in the destination address field of the new message composition user interface object is the e-mail address of the user's husband, richard@athome.com. A "New" button 90 enables the user to define a new rule.

Figure 5:
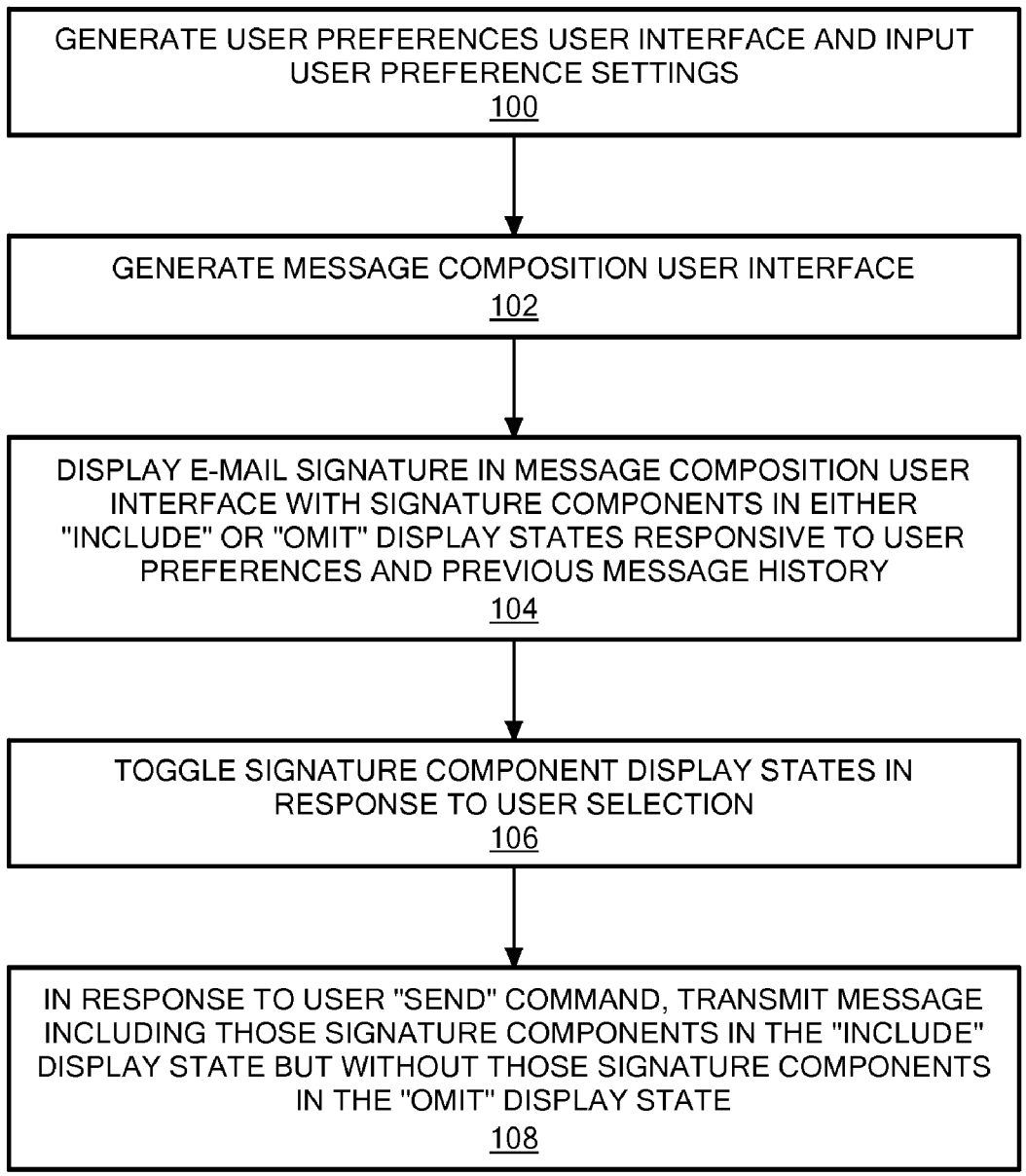
FIG. 5 is a flow chart showing steps performed by an illustrative embodiment of the disclosed system.

FIG. 5 is a flow chart showing steps performed by an illustrative embodiment of the disclosed system. At step 100, the disclosed system generates a user preferences user interface and inputs user preference settings. At step 102, the disclosed system generates a message composition user interface, and at step 104 displays the user's electronic mail signature in the message composition user interface with each component in either the "include" or "omit" display state based on the user's preferences and/or previous message history. At step 106, the disclosed system toggles individual components of the user's electronic mail signature between the "omit" and "include" states based on user selection of individual components. At step 108, in response to a "Send" command received from the user (e.g. detecting the user clicking on a "Send" button or the like), the message is transmitted such that signature components in the "include" state are contained in the message, but signature components in the "omit" state are not contained in the message.

Thus there is disclosed a system for dynamically managing electronic mail signatures that is convenient to use, and that accordingly improves the productivity of e-mail message authors by facilitating management of contact information sharing on a message-by-message basis. As described above, the disclosed system may be advantageously embodied to analyze recent collaborations, message history, recipient domains, and custom rules to provide a seamless and intuitive signature management system. In addition, the disclosed system provides a dynamic signature area within the new message composition user interface that allows the user to make quick and easy modifications to their signature information.

While the above description regarding illustrative embodiments of the disclosed system includes examples of specific user interface operations and/or display objects, the disclosed system is not limited to these specific embodiments. Accordingly, the user interface objects provided herein may be modified as appropriate for various alternative embodiments, using various specific configurations of graphical buttons, menus, dialog boxes, and the like. Those skilled in the art will accordingly recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and/or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

We claim:

1. A method of dynamically managing an electronic mail signature for messages in an electronic mail communication system, comprising:

displaying said electronic mail signature within a message composition user interface, wherein said message composition user interface is for composing an electronic mail message to be transmitted through said electronic mail communication system;

changing, in response to user selection of at least one component of said electronic mail signature in said message composition user interface, a display state of said at least one component of said electronic mail signature from a first display state to a second display state;

responsive to receiving a send message user command, transmitting, within said electronic mail message, components of said electronic mail signature that are in said first display state at the time said send message user command is received, and omitting from said electronic mail message components of said electronic mail signature that are in said second display state at the time said send message user command is received; and said displaying said electronic mail signature within said message composition user interface including determining at least one component of said electronic mail signature to be initially displayed in said second display state, and initially displaying said at least one component of said electronic mail signature determined to be initially displayed in said second display state in said second display state.

2. The method of claim 1, wherein said at least one component of said electronic mail signature comprises a line of text.

3. The method of claim 2, further comprising:
displaying said line of text in italicized format when said line of text is in said second display state.

4. The method of claim 1, wherein said at least one component of said electronic mail signature comprises a graphical object.

5. The method of claim 1, further comprising:
displaying components of said electronic mail signature that are in said second display state in proximity to a textual indication that said components of said electronic mail signature in said second display state will not be transmitted.

6. The method of claim 1, wherein said user selection of said at least one component of said electronic mail signature in said message composition user interface that causes said at least one component of said electronic mail signature to change from said first display state to said second display state comprises a mouse click on said at least one component of said electronic mail signature in said message composition user interface.

7. The method of claim 1, wherein said determining said at least one component of said electronic mail signature to be initially displayed in said second display state comprises:
generating a user preferences user interface display object; and
determining said at least one component of said electronic mail signature to be initially displayed in said second display state responsive to user selection of said at least one component through said user preferences user interface display object.

8. The method of claim 7, further comprising receiving, through said user preferences user interface display object, user indication to remove said electronic mail signature from messages being sent with history.

9. The method of claim 8, determining said at least one component of said electronic mail signature to be initially displayed in said second display state responsive to said user indication to remove said electronic mail signature from messages sent with history.

10. The method of 1 wherein said determining said at least one component of said electronic mail signature to be initially displayed in said second display state comprises:
generating a user preferences user interface display object; and
receiving, through said user preferences user interface display object, user indication of at least one electronic mail signature rule, wherein said electronic signature rule indicates at least one component of said electronic signature to be initially displayed in said second display state responsive to detecting an associated destination address within the destination field of the message composition user interface.

11. The method of claim 10, wherein said associated destination address is an individual user electronic mail address.

12. The method of claim 10, wherein said associated destination address is a domain name.

13. The method of 1 wherein said determining said at least one component of said electronic mail signature to be initially displayed in said second display state comprises:
determining a destination address indicated in a destination field of said message composition user interface;
comparing a total number of messages previously sent to said destination address within a predetermined time period to a frequency threshold value; and
responsive to determining that said total number of messages previously sent to said destination address within said predetermined time period is at least as large as said frequency threshold value, initially displaying all components of said electronic mail signature in said second display state.

14. The method of 13 wherein said determining said at least one component of said electronic mail signature to be initially displayed in said second display state comprises:
comparing an amount of time since a last message was previously sent to said destination address with a recency threshold value; and
responsive to determining both that said total number of messages previously sent to said destination address within said predetermined time period is at least as large as said frequency threshold value, and that said amount of time since said last message was previously sent to said destination address is not larger than said recency threshold value, initially displaying all components of said electronic mail signature in said second display state.

15. The method of claim 14, further comprising:
generating a user preferences user interface display object; and
receiving user indication of said frequency threshold value and said recency threshold value through said user preferences user interface display object.

16. A system including at least one processor and a computer readable memory storing program code executable on said at least one processor to dynamically manage an electronic mail signature for messages in an electronic mail communication system, said program code comprising:
program code operative when executed on said at least one processor to display said electronic mail signature within a message composition user interface, wherein said message composition user interface is for composing an electronic mail message to be transmitted through said electronic mail communication system;
program code operative when executed on said at least one processor to change, in response to user selection of at least one component of said electronic mail signature in said message composition user interface, a display state of said at least one component of said electronic mail signature from a first display state to a second display state;
program code operative when executed on said at least one processor to, responsive to receiving a send message user command, transmit, within said electronic mail message, components of said electronic mail signature that are in said first display state at the time said send message user command is received, and omit from said electronic mail message components of said electronic mail signature that are in said second display state at the time said send message user command is received; and said program code operative to display said electronic mail signature within said message composition user interface including program code operative to determine at least one component of said electronic mail signature to be initially displayed in said second display state, and to initially display said at least one component of said electronic mail signature determined to be initially displayed in said second display state in said second display state.

17. A computer program product comprising:

a computer readable medium; and program code stored on said computer readable medium for dynamically managing an electronic mail signature for messages in an electronic mail communication system by displaying an electronic signature within a message composition user interface, wherein said message composition user interface is for composing an electronic mail message to be transmitted through said electronic mail communication system, changing, in response to user selection of at least one component of said electronic mail signature in said message composition user interface, a display state of said at least one component of said electronic mail signature from a first display state to a second display state, transmitting, responsive to receiving a send message user command, within said electronic mail message, components of said electronic mail signature that are in said first display state at the time said send message user command is received, and omitting from said electronic mail message components of said electronic signature that are in said second display state at the time said send message user command is received, and said displaying said electronic mail signature within said message composition user interface including determining at least one component of said electronic mail signature to be initially displayed in said second display state, and initially displaying said at least one component of said electronic mail signature determined to be initially displayed in said second display state in said second display state.

* * * * *